United States Patent
Bhat et al.

(10) Patent No.: US 10,740,412 B2
(45) Date of Patent: Aug. 11, 2020

(54) PIVOTING SEARCH RESULTS ON ONLINE SOCIAL NETWORKS

(71) Applicant: Facebook, Inc., Menlo Park, CA (US)

(72) Inventors: Ashwin Bhat, Redwood City, CA (US); Rousseau Newaz Kazi, San Francisco, CA (US); Taylor Dancy Rogalski, San Francisco, CA (US); Christine Morck Rode, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 302 days.

(21) Appl. No.: 14/478,959

(22) Filed: Sep. 5, 2014

(65) Prior Publication Data

US 2016/0070790 A1    Mar. 10, 2016

(51) Int. Cl.
 *G06F 16/951* (2019.01)
 *G06F 16/9032* (2019.01)

(52) U.S. Cl.
 CPC ...... *G06F 16/951* (2019.01); *G06F 16/90324* (2019.01)

(58) Field of Classification Search
 CPC .......... G06F 17/30864; G06F 17/3097
 See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,539,697 B1 | 5/2009 | Akella | |
| 7,543,039 B2 * | 6/2009 | Himmelstein | .... G06F 17/30389 707/999.01 |
| 7,558,922 B2 * | 7/2009 | Murase | ............ G06F 17/30864 711/137 |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |

(Continued)

*Primary Examiner* — Mariela Reyes
*Assistant Examiner* — Edward Jacobs
(74) *Attorney, Agent, or Firm* — Jordan IP Law, LLC

(57) ABSTRACT

In one embodiment, a method includes receiving a search query inputted at a client device. The method includes searching a local cache of the client device to identify one or more objects stored in the local cache that match the search query, each object being associated with the online social network. The method includes generated, at the client device, a local search-results page including one or more local search results corresponding to one or more of the identified objects, respectively, and one or more search pivot elements corresponding to one or more object-types, respectively. Each local search result may be retrieved from the cache of the client device for display responsive to receiving the search query. Each search pivot element may be activatable to send the search query to the online social network and retrieve from the online social network one or more remote search results.

31 Claims, 11 Drawing Sheets

(56) References Cited

U.S. PATENT DOCUMENTS

| | | |
|---|---|---|
| 8,271,546 B2 | 9/2012 | Gibbs |
| 8,301,639 B1 | 10/2012 | Myllymaki |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,732,208 B2 | 5/2014 | Lee |
| 8,751,521 B2 | 6/2014 | Lee |
| 8,782,080 B2* | 7/2014 | Lee ............... G06F 17/30979 707/771 |
| 8,825,699 B2* | 9/2014 | Kruzeniski ......... G06F 3/0482 707/770 |
| 8,892,591 B1* | 11/2014 | Haugen ............ G06F 17/30696 707/723 |
| 8,935,245 B1* | 1/2015 | Cionca ............. G06F 17/30554 707/732 |
| 8,938,500 B1* | 1/2015 | Acharya ............... G06Q 50/01 705/319 |
| 8,972,368 B1* | 3/2015 | de Sousa .......... G06F 17/30477 707/705 |
| 9,280,580 B1* | 3/2016 | Lider ............... G06F 17/30867 |
| 9,361,406 B1* | 6/2016 | Taropa ............. G06F 17/30867 |
| 9,424,359 B1* | 8/2016 | Ghassemi Hamadani ........... G06F 16/3322 |
| 9,898,507 B2* | 2/2018 | Bedrax-Weiss ............ G06F 17/30477 |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0255237 A1 | 12/2004 | Tong |
| 2005/0091202 A1 | 4/2005 | Thomas |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0150450 A1* | 6/2007 | Murase ............ G06F 17/30864 |
| 2007/0208727 A1* | 9/2007 | Saklikar ........... G06F 17/30587 |
| 2007/0277100 A1 | 11/2007 | Sheha |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippori |
| 2010/0049802 A1 | 2/2010 | Raman |
| 2010/0228744 A1 | 9/2010 | Craswell |
| 2010/0235354 A1 | 9/2010 | Gargaro |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191332 A1* | 8/2011 | Barve .................. G06F 16/00 707/723 |
| 2011/0191371 A1 | 8/2011 | Elliott |
| 2011/0196855 A1 | 8/2011 | Wable |
| 2011/0276396 A1 | 11/2011 | Rathod |
| 2011/0307463 A1* | 12/2011 | Kasterstein ....... G06F 17/30716 707/706 |
| 2011/0313992 A1 | 12/2011 | Groeneveld |
| 2012/0059708 A1 | 3/2012 | Galas |
| 2012/0066202 A1* | 3/2012 | Hatazawa ......... G06F 17/30864 707/710 |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0191716 A1* | 7/2012 | Omoigui ............ H01L 27/1463 707/740 |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2012/0317097 A1* | 12/2012 | Tseng .................... G06F 16/951 707/722 |
| 2013/0031106 A1* | 1/2013 | Schechter ............. G06Q 30/02 707/749 |
| 2013/0041876 A1 | 2/2013 | Dow |
| 2013/0066876 A1 | 3/2013 | Raskino |
| 2013/0080946 A1* | 3/2013 | Arkhipov .............. G06F 3/0484 715/762 |
| 2013/0086057 A1 | 4/2013 | Harrington |
| 2013/0124538 A1 | 5/2013 | Lee |
| 2013/0124542 A1* | 5/2013 | Lee .................. G06F 17/30392 707/751 |
| 2013/0144899 A1* | 6/2013 | Lee ....................... G06Q 50/01 707/759 |
| 2013/0166543 A1* | 6/2013 | MacDonald ...... G06F 17/30867 707/723 |
| 2013/0185649 A1* | 7/2013 | Mahood ............... G06Q 10/107 715/752 |
| 2013/0191372 A1* | 7/2013 | Lee .................. G06F 17/30958 707/722 |
| 2013/0191416 A1* | 7/2013 | Lee .................. G06F 17/30979 707/771 |
| 2013/0226918 A1 | 8/2013 | Berkhim |
| 2013/0246404 A1* | 9/2013 | Annau ............. G06F 17/30672 707/723 |
| 2013/0297582 A1* | 11/2013 | Zukovsky ............ G06F 16/951 707/706 |
| 2013/0297590 A1* | 11/2013 | Zukovsky ............ G06F 16/951 707/722 |
| 2014/0095419 A1* | 4/2014 | Gandhi .................... G06N 5/02 706/46 |
| 2014/0372956 A1* | 12/2014 | Bisca ................ G06F 17/30958 715/848 |
| 2015/0046423 A1* | 2/2015 | Weeks ............. G06F 17/30864 707/708 |
| 2015/0049080 A1* | 2/2015 | Purayil .............. H04L 67/2847 345/419 |
| 2015/0156609 A1* | 6/2015 | Davis ................... H04W 4/021 455/457 |
| 2015/0169691 A1* | 6/2015 | Bedrax-Weiss ............ G06F 17/30902 707/722 |
| 2015/0205833 A1* | 7/2015 | Choc ................ G06F 17/30899 707/767 |
| 2015/0310100 A1* | 10/2015 | Bursey ............. G06F 17/30864 707/706 |
| 2015/0317313 A1* | 11/2015 | Lv ............................ G06F 16/33 707/730 |

* cited by examiner

Search: Caruso

- Samantha Warren Caruso — Boston College · Mount Anthony Senior Uni...
- Chris Caruso — Boston College · Bergen Catholic High School
- Andrea Caruso — 22 mutual friends
- Christopher Caruso — 4 mutual friends
- April Caruso — 1 mutual friend
- Caruso brick oven — 75 mi · Italian · 1,241 were here · ...
- Dana Caruso — 1 mutual friend
- Nick Caruso — Editor at Thrillist
- Lauren Caruso — 1 mutual friend 602 → See More Results...

News Feed | Requests | Messages | Notifications | More

PIVOTING SEARCH RESULTS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may provide improved suggestions in the mobile typeahead context by pivoting from a set of local search results to a full set of search results. Previously, when a user began entering a search term, typeahead (described in further detail below) would provide a limited list of suggested completions (e.g., top 10 to 30 hits). For some queries, typeahead may only provide locally stored results. If the desired result is not present, the user may believe that the search was unsuccessful (or possibly that the desired entity does not exist) and give up. However, the desired entity may be available deeper in the list of search results, or with a full server search.

In particular embodiments, when a user inputs a search string, the mobile device may present locally stored results. After scrolling to the bottom of the results, the user may be presented with a pivot element, for example, a "See More Results" button. If the user selects the button, the mobile device may send a request to the social-networking system to perform a full search based on the search string. The results provided to the user may be all results of the search (i.e., the results will no longer be capped). Additionally, the results may be organized by object-type into various search modules. Additional pivot elements allow the user to view all results together or results limited to a specific entity-type. In particular embodiments, a full search may be performed before the "See More Results" button is selected. In such embodiments, the search results may be capped, and the user can pivot to a full list of search results by selecting the "See More Results" button.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 6A-6D illustrate example search-results pages of the social network.

DESCRIPTION OF EXAMPLE EMBODIMENTS

System Overview

Figure 1:
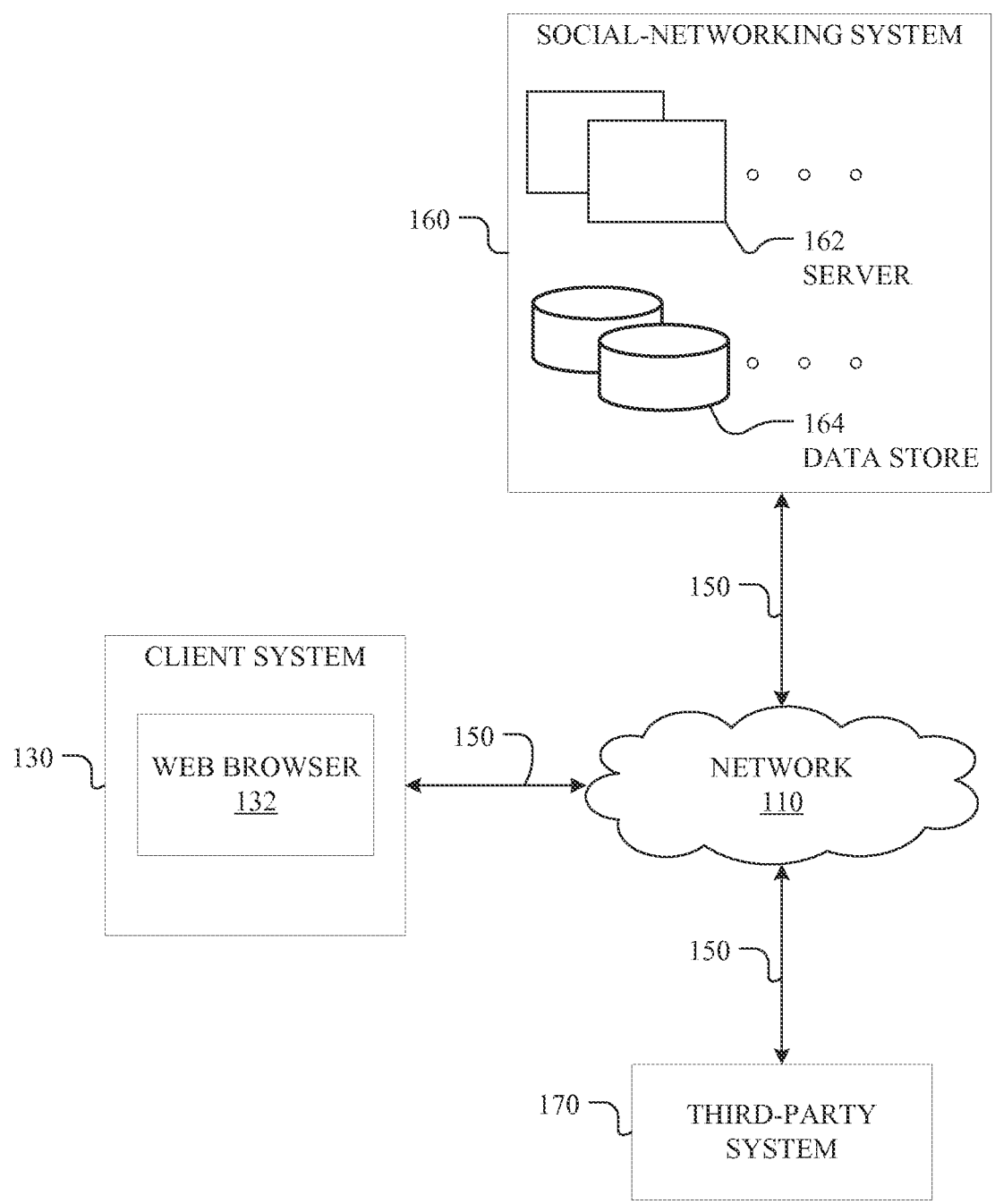
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
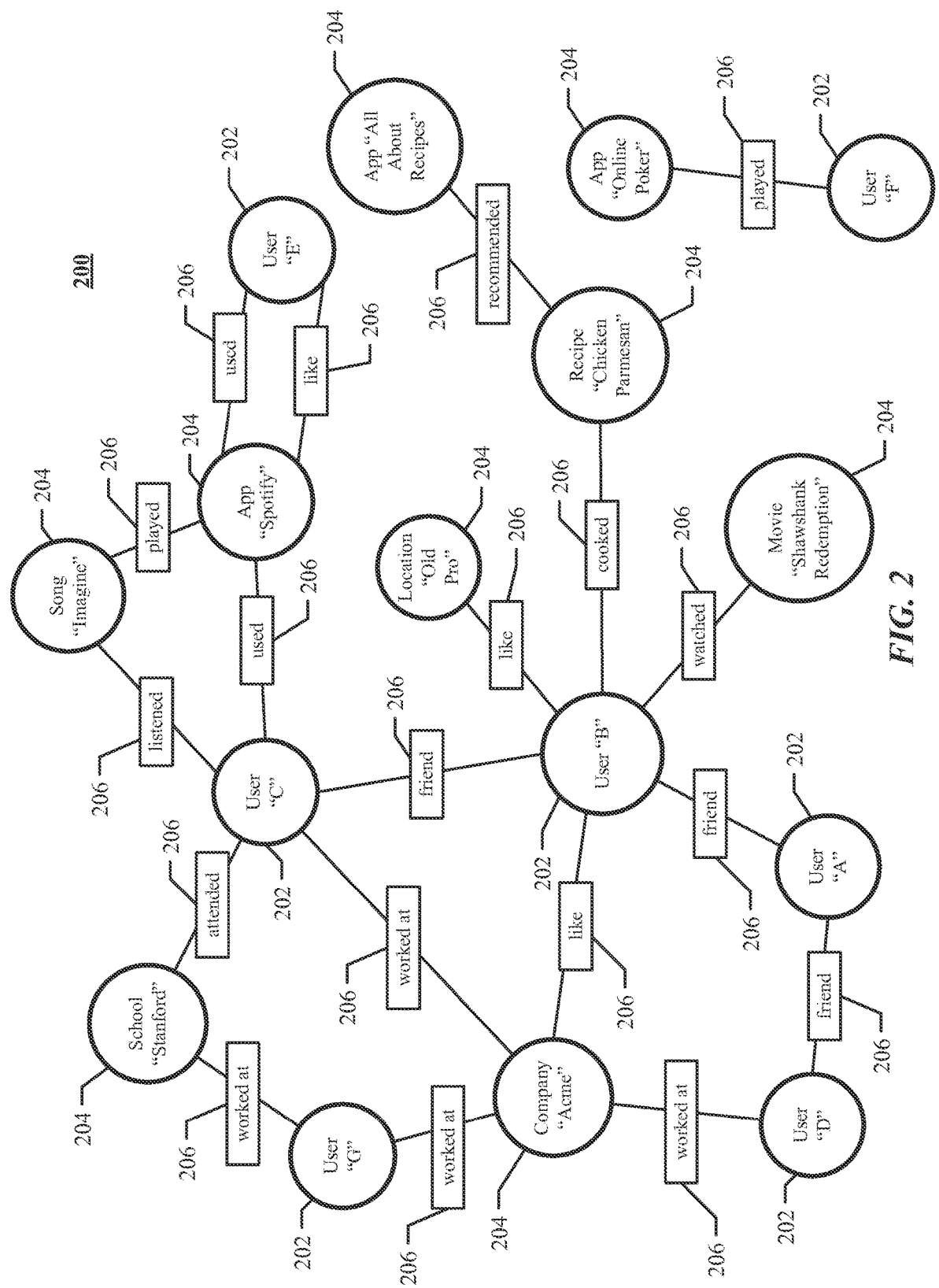
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indexing Based on Object-Type

Figure 3:
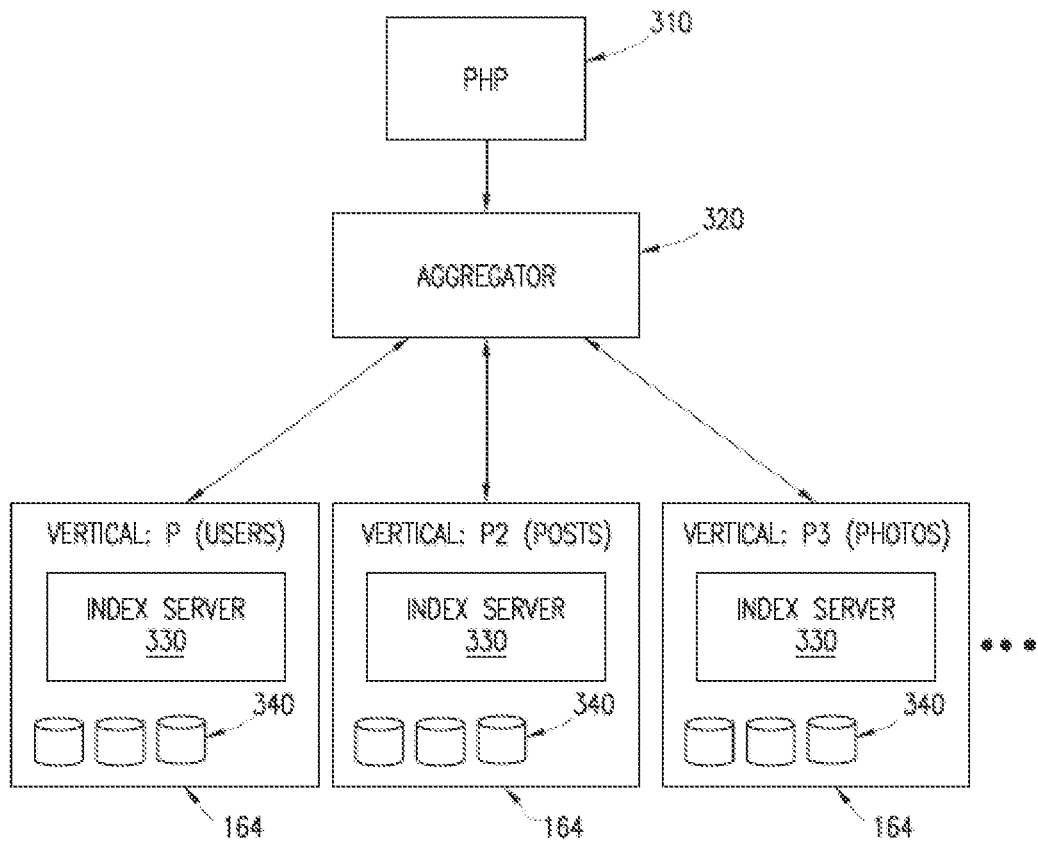
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a location, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from the PHP process 310. The aggregator 320 may be one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 310 illustrated in FIG. 3. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request. In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 4:
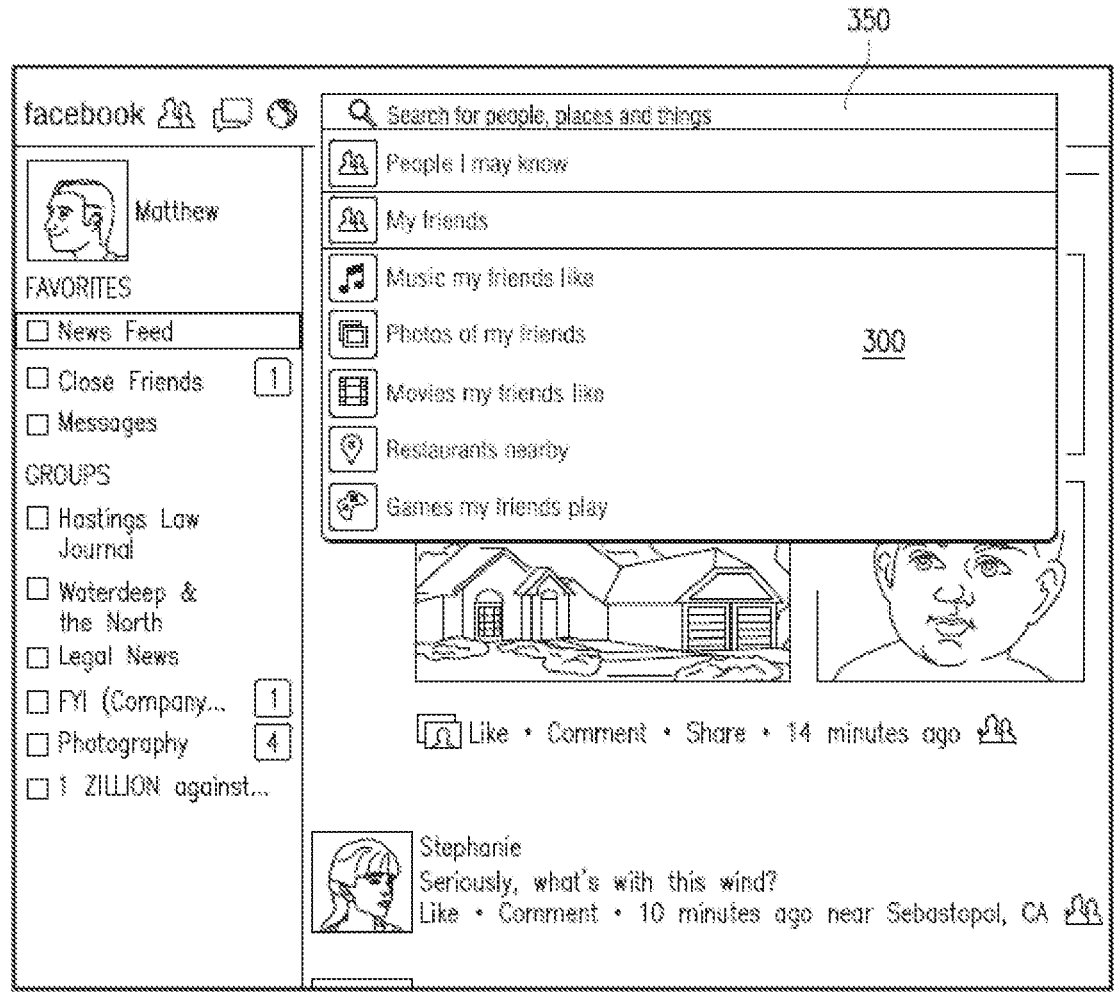
FIG. 4 illustrates an example page of an online social network.

FIG. 4 illustrates an example page of an online social network. In particular embodiments, a user may submit a query to the social-networking system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into query field 350 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Figure 5A:
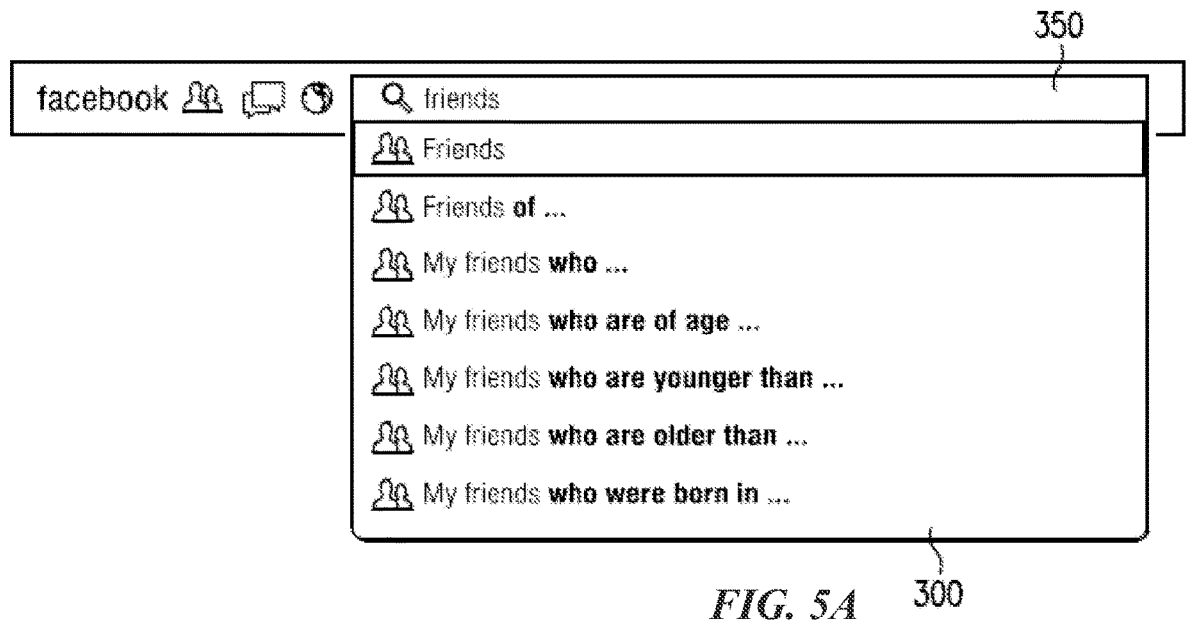
FIGS. 5A-5B illustrate example queries of the social network.
Figure 5B:
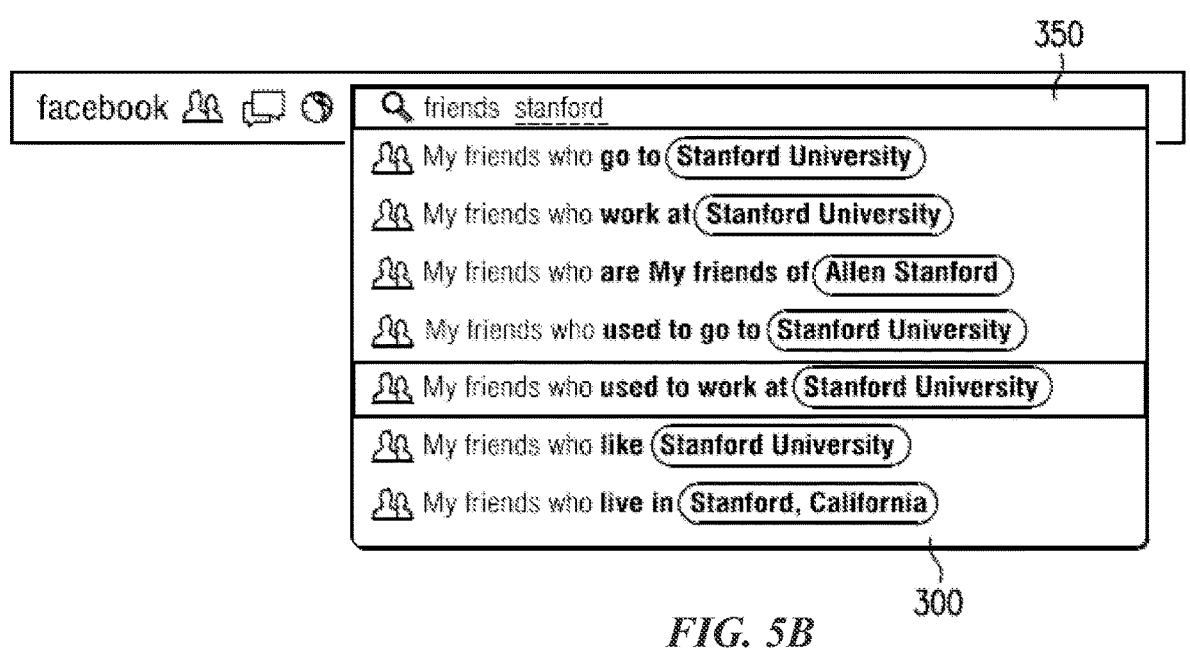

FIGS. 5A-5B illustrate example queries of the social network. In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate which social-graph element the querying user intended to reference with the ambiguous term. In response to the querying user's selection, the social-networking system 160 may then lock the ambiguous term in the query to the social-graph element selected by the querying user, and then generate a new set of structured queries based on the selected social-graph element. FIGS. 5A-5B illustrate various example text queries in query field 350 and various structured queries generated in response in drop-down menus 300 (although other suitable graphical user interfaces are possible). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIGS. 5A-5B illustrate generating particular structured queries in a particular manner, this disclosure contemplates generating any suitable structured queries in any suitable manner.

In particular embodiments, the social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 5A-5B. As the querying user enters this text query into query field 350, the social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me)", or "/search/me/friends/ [node ID for Stanford University]/students/ever-past/intersect", which could be executed as a query in a social-graph database). Although this disclosure describes receiving particular queries in a particular manner, this disclosure contemplates receiving any suitable queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference.

Pivoting Search Results

In particular embodiments, social-networking system 160 may provide improved search results in the mobile typeahead context by pivoting from a set of local search results retrieved from a cache of the mobile client system 130 to a full set of search results retrieved from the social-networking system 160. When a querying user begins entering a search term, a frontend typeahead process may provide a limited list of suggested completions, which may be locally stored results retrieved from a cache of the mobile client system 130 (also referred to herein as "bootstrapped results"). In particular embodiments, the initial search may be a broader typeahead search of the social-networking system 160 (i.e., frontend and backend typeahead processes). If the user does not receive the intended results, the user may select a search pivot element, thereby causing the social-networking system 160 to perform a full server search. As an example and not by way of limitation, and as described further below, if a user of a mobile client system 130 enters the search term "caruso," then the social-networking system 160 may search a local cache of the mobile client system 130 and identify objects that are stored in the local cache that match the search query "caruso." However, the querying user may not see the desired result. Therefore, to see more results, the querying user may be able to select a search pivot element to pivot to a full search of the social-networking system 160 and receive a search-results page including search results retrieved from the social-networking system 160 (also referred to as remote search results). The querying user can further pivot to a search of specific object-types, for example, by selecting a search pivot element corresponding to a particular object-type. As an example and not by way of limitation, the querying user may choose to pivot to a page-type search-results page, because the user is looking for a restaurant and restaurants may be associated with a page-type concept node 204. Although this disclosure describes pivoting between particular search results in a particular manner, this disclosure contemplates pivoting between any suitable search results in any suitable manner.

In particular embodiments, social-networking system 160 may receive a search query inputted at a client device 130. The search query may be received from a querying user of an online social network, and can be received at the client device 130. The client device 130 may be, for example, a mobile telephone, personal digital assistant (PDA), a tablet computer, or similar mobile device. In some embodiments, and as described above, the search query may be an unstructured text query. As an example and not by way of limitation, social-networking system 160 may receive from a client device 130 a search query such as "caruso" or "friends caruso." Furthermore, as discussed previously, social-networking system 160 may parse the text query to identify one or more n-grams. One or more of the n-grams may be an ambiguous n-gram. As noted above, if an n-gram is not immediately resolvable to a single social-graph element based on the parsing algorithm used by the social-networking system 160, it may be an ambiguous n-gram. The parsing may be performed as described in detail hereinabove. As an example and not by way of limitation, social-networking system 160 may receive the text query "friends caruso." The text query may be parsed into the n-grams "friend" and the ambiguous n-gram "caruso." "caruso" is an ambiguous n-gram because it does not match a specific element of social graph 200. By contrast, "friends" refers to a specific type of edge 206, "friend," and therefore may not be considered ambiguous. Although this disclosure describes receiving a search query in a particular manner, this disclosure contemplates receiving a search query in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into the query field 350 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays references to the matching profile pages (e.g., a name or photo associated with the page) of the respective user nodes 202 or concept nodes 204, and displays names of matching edges 206 that may connect to the matching user nodes 202 or concept nodes 204, which the user can then click on or otherwise select, thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and/or edges, the typeahead process may send a request that informs social-networking system 160 of the user's confirmation of a query containing the matching social-graph elements. In response to the sent request, social-networking system 160 may automatically (or alternately based on an instruction in the request) call or otherwise search a social-graph database for the matching social-graph elements, or for social-graph elements connected to the matching social-graph elements as appropriate. In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/732,101, filed 31 Dec. 2012, each of which is incorporated by reference. Although this disclosure describes applying the typeahead processes to search queries in a particular manner, this disclosure contemplates applying the typeahead processes to search queries in any suitable manner.

In particular embodiments, social-networking system 160 may search a local cache of the client device 130 to identify one or more objects stored in the local cache that match the search query. The local cache may be associated with a web browser 132 of client system 130, or a native application on client system 130 associated with the online social network. The cache may store information about one or more cached objects associated with the online social network. In response to a query inputted at a client device 130, rather than querying the social-networking system 160, the client device 130 may access the cache to search for matching objects (via, for example, a client-side search process). Any suitable objects (or portions of objects) associated with the online social network may be cached on the client system 130 of the querying user. Cached object (or information about such objects) may include, for example, pages associated with nodes having a high social-graph affinity with respect to the querying user (e.g., user-profile pages of close friends or family, pages of social-graph entities followed/liked by the user, event-profile pages the user has indicated he/she will attend, etc.), friends of the querying user, frequently accessed pages, recently accessed pages, other suitable objects, or any combination thereof. In particular embodiments, social-networking system 160 may search the cache to identify one or more cached objects that substantially match the character string of the search query input. Cached objects may be search and identified analogously to objects stored in verticals 164, as described previously. In particular embodiments, social-networking system 160 may send to the querying user one or more references to one or more of the identified cached objects, respectively. Where the identified object is stored in the cache of the client system 130 of the querying user, social-networking system 160 may simply instruct the web browser 132 to retrieve the cached object from the cache. Alternatively, the identified cached object may be retrieved from the social-networking system 160. As an example and not by way of limitation, in response to the search query "friends caruso," the social-networking system 160 may parse the query to identify the n-grams "friends" and "caruso." The social-networking system 160 may identify a plurality of nodes 202 that match the ambiguous n-gram "caruso" and may be stored in the querying user's local cache. For example, social-networking system 160 may identify "Elise Caruso Ritter," and "Samantha Warren Caruso," which are user-type nodes 202, or "Caruso brick oven," which is a page-type node 202. Although this disclosure describes searching a local cache in a particular manner, this disclosure contemplates searching a local cache in any suitable manner.

In particular embodiments, social-networking system 160 may generate a local search-results page including one or more local search results corresponding to the one or more of the identified objects, respectively. The local search-results pages may also include one or more search pivot elements corresponding to one or more object-types respectively. The local search-results page may be generated at the client device 130. Each local search result may have been retrieved from the cache of the client device 130 for display responsive to receiving the search query. Each search pivot element may be activatable to send the search query to the social-networking system 160 and retrieve from the social-networking system 160 one or more remote search results corresponding to one or more objects, respectively, that match the search query. In some embodiments, the social-networking system 160 may receive from the client device 130 of the querying user an indication that a search pivot element has been activated. The social-networking system 160 may search the social network to identify one or more additional objects stored in the social-networking system 160 that match the search query. Each object retrieved from the social-networking system 160 may be of the object-type corresponding to the activated search pivot element. In some embodiments, the search pivot element may correspond to a plurality of object-types, for example, all possible object-types. In some embodiments, the search pivot element may correspond to a single object-type. The object-types may be, for example, users, photos, posts, pages, applications, events, locations, user groups, or other suitable object-types associated with the online social network. In particular embodiments, social-networking system 160 may receive one or more remote search results, in response to an activation of one or more of the search pivot elements. The social-networking system 160 may send to the client device 130 a search-results page including one or more search results corresponding to the local identified objects and the remote identified objects, as well as one or more search pivot elements corresponding to one object-type respectively. As an example and not by way of limitation, if the social-networking system 160 has identified local objects "Elise Caruso Ritter," "Samantha Warren Caruso," "Caruso brick oven," and others, as described above, the social-networking system 160 may generate a local search results page including search results corresponding to "Elise Caruso Ritter," "Samantha Warren Caruso," "Caruso brick oven," and other identified objects, along with one or more search pivot elements. The search pivot element may be in the form of a button, and may be labeled "See More Results . . . ." The querying user may select the one of the search results to visit the profile page associated with the selected search result. However, the user may also select one of the search pivot elements, which may cause the client system 130 to send the search query to the social-networking system 160 and perform a full search, which can include local search results and remote search results. The social-networking system 160 can generate a search-results page including the local and remote search results, as well as search pivot elements corresponding to one object-type. Although this disclosure describes generating search-results pages in a particular manner, this disclosure contemplates generating search-results pages in any suitable manner.

In particular embodiments, the remote search results may be generated by the social-networking system 160 by searching a plurality of verticals 164 to identify one or more objects in each vertical 164 that match the search query. In particular embodiments, the social-networking system 160 may blend the identified objects from each vertical 164 to form a set of blended search results. As an example and not by way of limitation, if the querying user enters the query "caruso," the social-networking system 160 may search a user vertical 164 and identify a number of users (corresponding each to particular user nodes 202) that match the query because the users have a name (or are associated with other information, such as their hometown or school) that matches the search query "caruso." Additionally, the social-networking system 160 may search the pages vertical 164 and identify a number of locations, groups, or other entities, that match the search query "caruso." The social-networking system 160 may generate a search-search results page that blends the user results and page results. More on blending processes may be found in U.S. application Ser. No. 14/244,748, filed on 3 Apr. 2014, and U.S. application Ser. No. 14/454,826, filed on 8 Aug. 2014, each of which is incorporated by reference. The social-networking system 160 may provide a threshold number of results, for example twenty, or the social-networking system 160 may return all relevant search results. In particular embodiments, the search query may be sent to the social-networking system 160 before the querying user activates a search pivot element, or even possibly while the querying user is still inputting the query, for example, by sending a priming request to the social-networking system 160 and pre-generating search results in advance. Priming requests may be sent to the social-networking system 160, for example, after the querying user inputs a threshold number of characters into the query field 350. In particular embodiments, in order to accelerate the delivery of search results to a user operating a client system 130, social-networking system 160 may "prime" the search results associated with one or more search queries. The accelerated delivery of search results may be particularly useful, for example, in the mobile context (i.e. client system 130 is a mobile client system such as for example, a smart phone, a mobile laptop, or tablet), where sending search results from social-networking system 160 (or any other suitable backend servers) to mobile client system 130 in response to a user's query may be slow, for example, due to bandwidth limitations. As the user inputs a character string into a query field, social-networking system 160 may generate a plurality of predicted search queries substantially matching the search query request in real-time as the user is still inputting characters. As an example and not by way of limitation, if a user has inputted the character string "stanford u" into the query field, social-networking system 160 may generate a predicted search query for "Stanford University." Social-networking system 160 may anticipate, from the character string currently inputted by the user, one or more predicted queries that may be selected by the user, and send priming requests corresponding to one or more of the predicted queries to a query server (for example, search-engine server 162B) to retrieve one or more search results matching the queries. The priming request may be a particular request sent to a query server, or may simply be another type of call to the query server (e.g., a call to a frontend and/or backend typeahead process), which social-networking system 160 determines to execute as a priming request. In particular embodiments, these search results may be sent, by social-networking system 160, to client system 130 for storage in a cache (for example, cache 402) of client system 130. In other words, social-networking system 160 may generate search results corresponding to one or more of these predicted search queries before the user completes inputting a query, and then send the search results to the user's client system 130 to be cached. These search results may be generated and sent in response to a priming request, which may be sent from client system 130, or determined by social-networking system 160. As such, the search results may be retrieved from social-networking system 160 and loaded into the cache of client system 130 before the user has even entered the query completely. In other words, before the querying user even completes the query and hits "Search" or otherwise runs the query, social-networking system 160 may generate and send search results to the user's client system 130 in anticipation of the user completing the query input and running the query. Once the querying user completes inputting the query and hits "Search", client system 130 may immediately retrieve the pre-generated search results from a client-side cache for display to the user (for example, assuming the final query inputted by the user actually matches one of the predicted queries that was primed). Because the search results may be retrieved quickly from the cache of client system 130, the priming requests allow the user to experience a near-instantaneous search query functionality. In particular embodiments, the search results generated in response to a priming request may be generated by social-networking system 160 and stored in a cache associated with social-networking system 160, and then sent once the querying user completed inputting the query (e.g., by selecting "Search"). As such, the search results may be generated and stored in a cache of the social-networking system 160 before the user has even entered the query completely. In other words, before the querying user even completes the query and hits "Search" or otherwise runs the query, social-networking system 160 may generate and store search results to a server-side cache in anticipation of the user completing the query input and running the query. Once the querying user completes inputting the query and hits "Search", client system 130 may immediately retrieve the pre-generated search results from a server-side cache for display to the user (for example, assuming the final query inputted by the user actually matches one of the predicted queries that was primed). Because the search results may be retrieved quickly from the cache of social-networking system 160, the priming request may allow the user to experience a quicker search query functionality compared to the scenario where the user has to first wait for the social-networking system 160 to first generate search results. Furthermore, social-networking system 160 may send one or more of the predicted queries, as suggested queries, to client system 130 for display to the user. If the user selects one of the suggested queries, client system 130 may instantaneously send the one or more cached search results associated with the selected suggested query for display to the user. In particular embodiments, if the user inputs a query that does not match one of the predicted queries that was primed (e.g., does not select any of the suggested queries and instead complete a new query), client system 130 may at that point send the search query to social-networking system 160 to retrieve one or more search results corresponding to the new query. In particular embodiments, if the search results corresponding to the user's selected query cannot be found in the cache of the client device, client system 130 may send the selected query to social-networking system 160 to retrieve one or more search results corresponding to the selected query. More on priming requests may be found in U.S. application Ser. No. 14/473,123, filed on 29 Aug. 2014, which is incorporated by reference. Although this disclosure describes generating remote search results in a particular manner, this disclosure contemplates generating remote search results in any suitable manner.

Figure 6A:
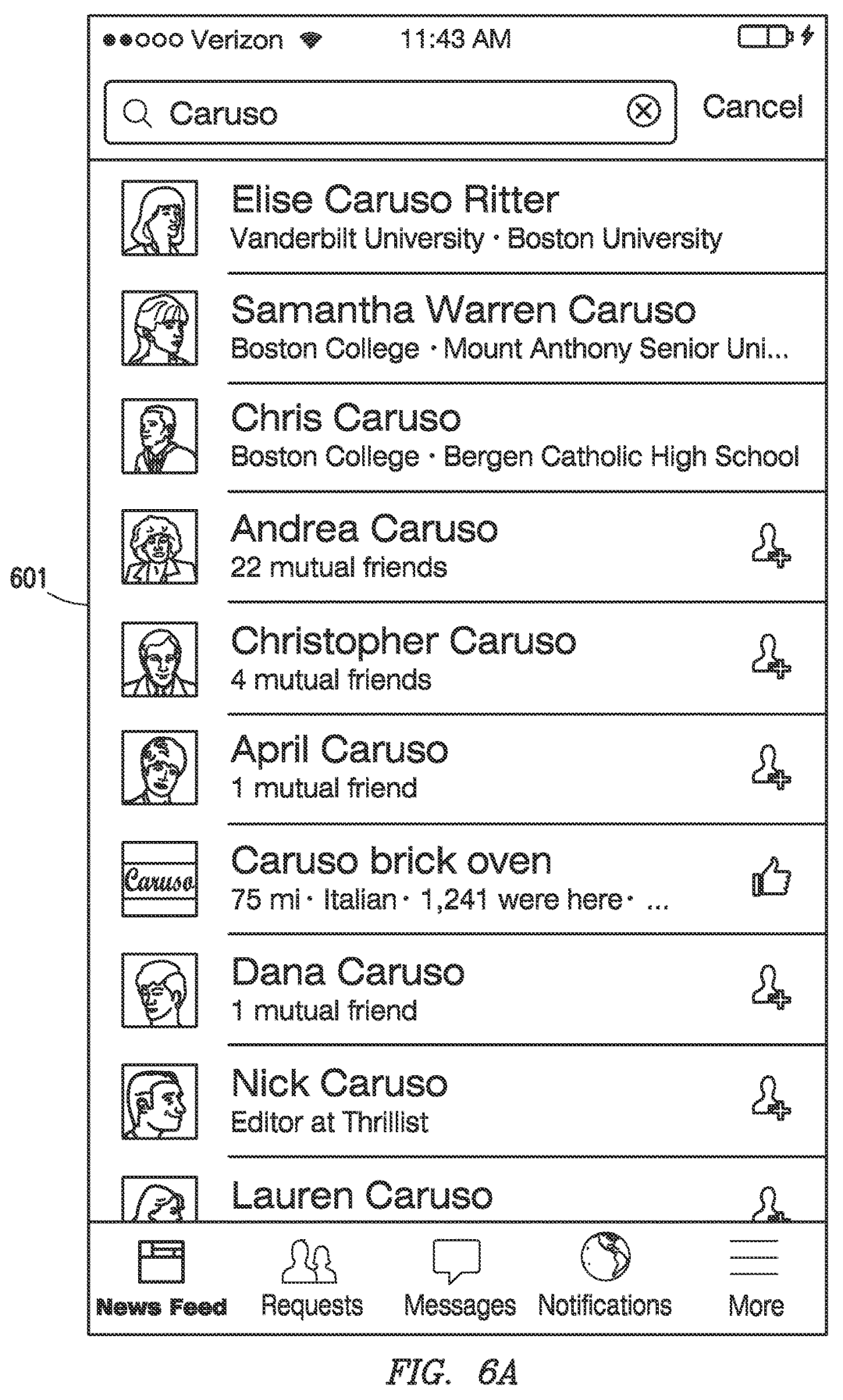
Figure 6C:
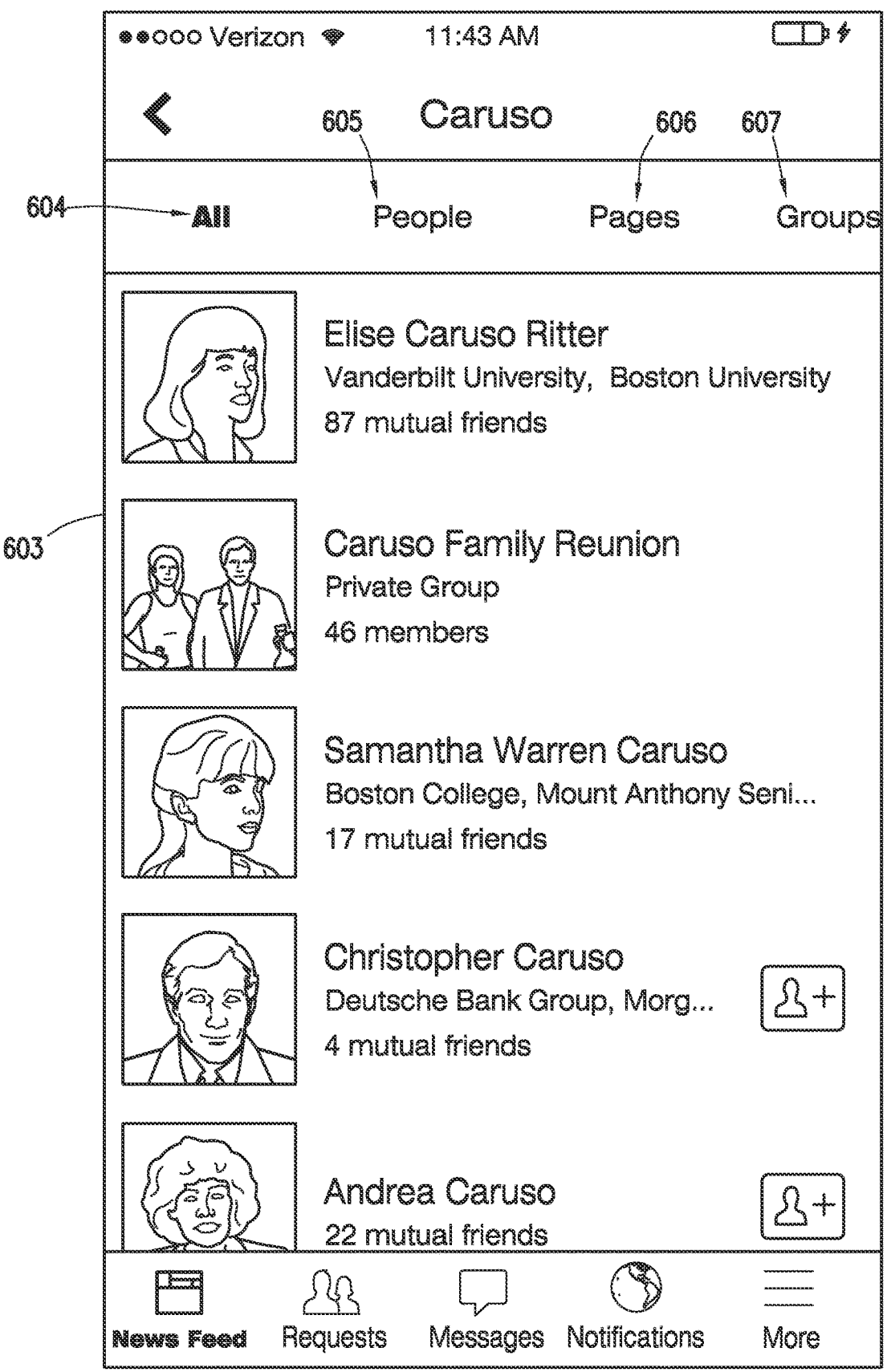
Figure 6D:

FIGS. 6A-6D illustrate example search-results pages of the online social network. In FIG. 6A, a querying user has entered the query "Caruso" into a mobile client device 130. As an example and not by way of limitation, the user may be searching for a restaurant with "Caruso" in the name. In FIG. 6A, the social-networking system 160 has performed a search of the local cache of the mobile client device 130 and identified a plurality of objects stored in the local cache that match the search query, and generated a local search-results page 601 including a plurality of search results corresponding to the plurality of identified objects. As shown in FIG. 6A, the local search-results page 601 includes "Elise Caruso Ritter," "Samantha Warren Caruso," "Chris Caruso," and "Caruso brick oven," among others. These objects have been identified as matching the search query because they include "Caruso" in the names of the objects (each of which is associated with a node of social graph 200). The objects may be stored in the local cache of the querying user's client device 130 because, for example, the object has a high social-graph affinity with respect to the querying user, or the querying user has previously visited each profile page associated with the identified objects. Next, as illustrated in FIG. 6B, the querying user has scrolled to the bottom of the local search-results page 601. The local search-results page 601 include a search pivot element 602. The search pivot element 602 is a button labeled with "See More Results . . . ." The search pivot element 602 corresponds to each object-type available in the social-networking system 160, including users, photos, posts, pages, applications, events, locations, and user groups. In the example illustrated in FIGS. 6A-6D, the user has determined that the desired restaurant is not included in the local search-results page (i.e., Caruso brick oven may not be the correct restaurant), and therefore the user activates the search pivot element 602. By activation of the search pivot element 602, client system 130 will send the search query to the social-networking system 160 and perform a full search. FIG. 6C illustrates a search-results page 603 including the results of the full search. The full search may include a search of verticals 164 as described in detail above. The results in FIG. 6C includes search results that were previously seen in local search-results page 601 and new search results from the remote search. In particular embodiments, the remote results may supersede the local results, however, some of the local results may be captured in the remote search. In alternative embodiments, local results and remote results may be blended together in the search results page 603. The search results may be organized by relevance to the user, thus, the top hits in FIG. 6C may include the local search results because the user has previously visited the pages associated with those results. Search-results page 603 illustrates search results associated with people-type objects (e.g., "Elise Caruso Ritter" and "Samantha Warren Caruso") and a group-type object (e.g., "Caruso Family Reunion"). The search-results page 603 may include results corresponding to each object-type available in the social-networking system 160, including users, photos, posts, pages, applications, events, locations, and user groups. The search-results page 603 may also include a plurality of search pivot elements 604-607. The search pivot elements may be associated with a plurality of object-types (e.g., the search pivot element 604 associated with all object-types) or the search pivot elements 604-607 may be associated with one object-type (e.g., the search pivot elements 605, 606, and 607 associated with people-type objects, page-type objects, and group-type objects, respectively). The user in the current example is searching for a restaurant, so the user chooses not to scroll through the search-results page 603, shown in FIG. 6C, which includes all relevant hits, and may include all object-types, and activates the search pivot element 606 associated with Pages. FIG. 6D illustrates a search-results page 608 including only page-type search results. The search-results page 608 in FIG. 6D includes "Caruso's Italian Restaurant," "Caruso's Bistro," and "Caruso's," one of which may have been the restaurant the querying user was searching for. In particular embodiments, the search-results pages may be displayed on a user interface of a native application associated with the online social network on the client system 130 of the first user. As an example and not by way of limitation, the native application may be an application associated with the social-networking system 130 on a user's mobile client system 130 (e.g. a smart phone, tablet, etc.). In particular embodiments, the search-results may be displayed on a webpage of the online social network accessed by a browser client 132 on the client system 130 of the first user. Although this disclosure describes displaying the search-results pages in a particular manner, this disclosure contemplates displaying the search-results pages in any suitable manner.

Figure 7:
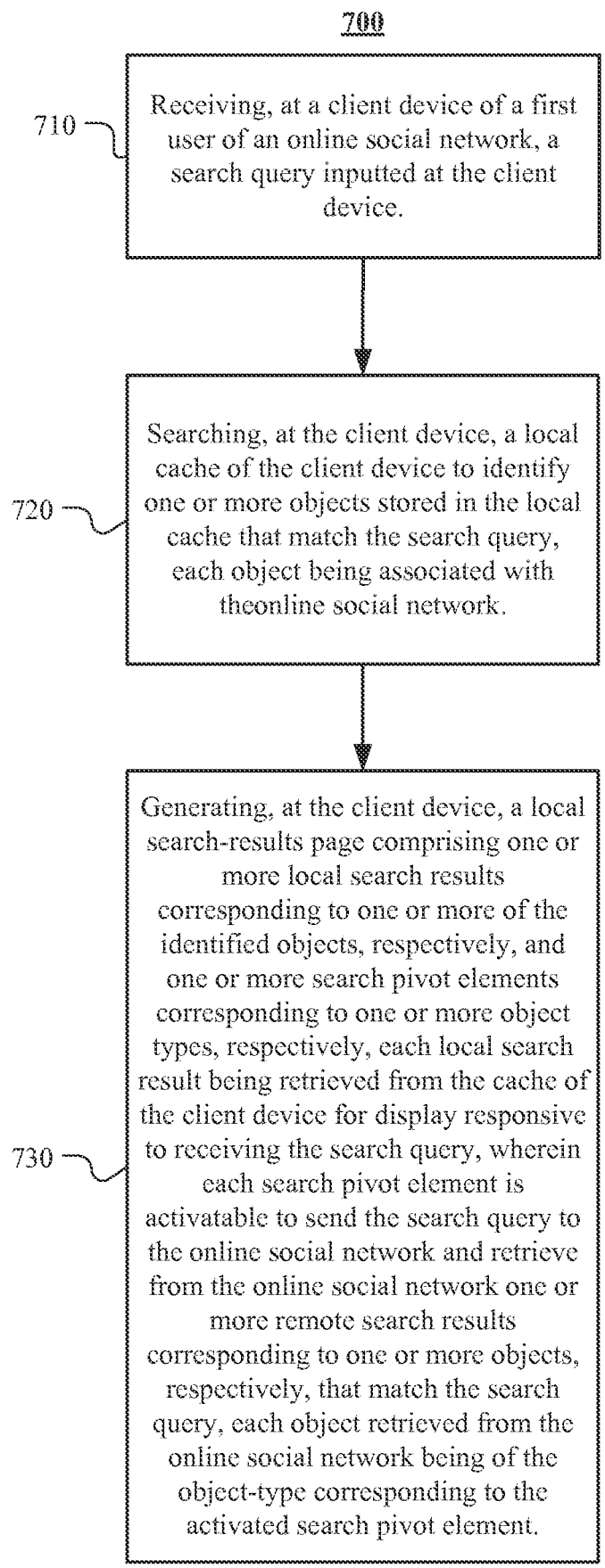
FIG. 7 illustrates an example method for generating local search-results pages including a pivoting element.

FIG. 7 illustrates an example method 700 for generating local search-results pages including a pivoting element. The method may begin at step 710, where social-networking system 160 may receive a search query inputted at the client device. The search query may be received at a client device of a first user of an online social network. At step 720, social-networking system 160 may search a local cache of the client device to identify one or more objects stored in the local caches that match the search query. The search may be performed at the client device. Each object may be associated with the online social network. At step 730, social-networking system 160 may generate a local search-results page including one or more local search results corresponding to one or more of the identified objects, respectively, and one or more search pivot elements corresponding to one or more object-types, respectively. The local search-results page may be generated at the client device. Each of the local search results may be retrieved from the cache of the client device for display responsive to receiving the search query. Each search pivot element may be activatable to send the search query to the online social network and retrieve from the online social network one or more remote search results corresponding to one or more objects, respectively, that match the search query. Each object retrieved from the online social network may be of the object-type corresponding to the activated search pivot element. Particular embodiments may repeat one or more steps of the method of FIG.

7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating local search-results pages including a pivoting element including the particular steps of the method of FIG. 7, this disclosure contemplates any suitable method for generating local search-results pages including a pivoting element including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 8:
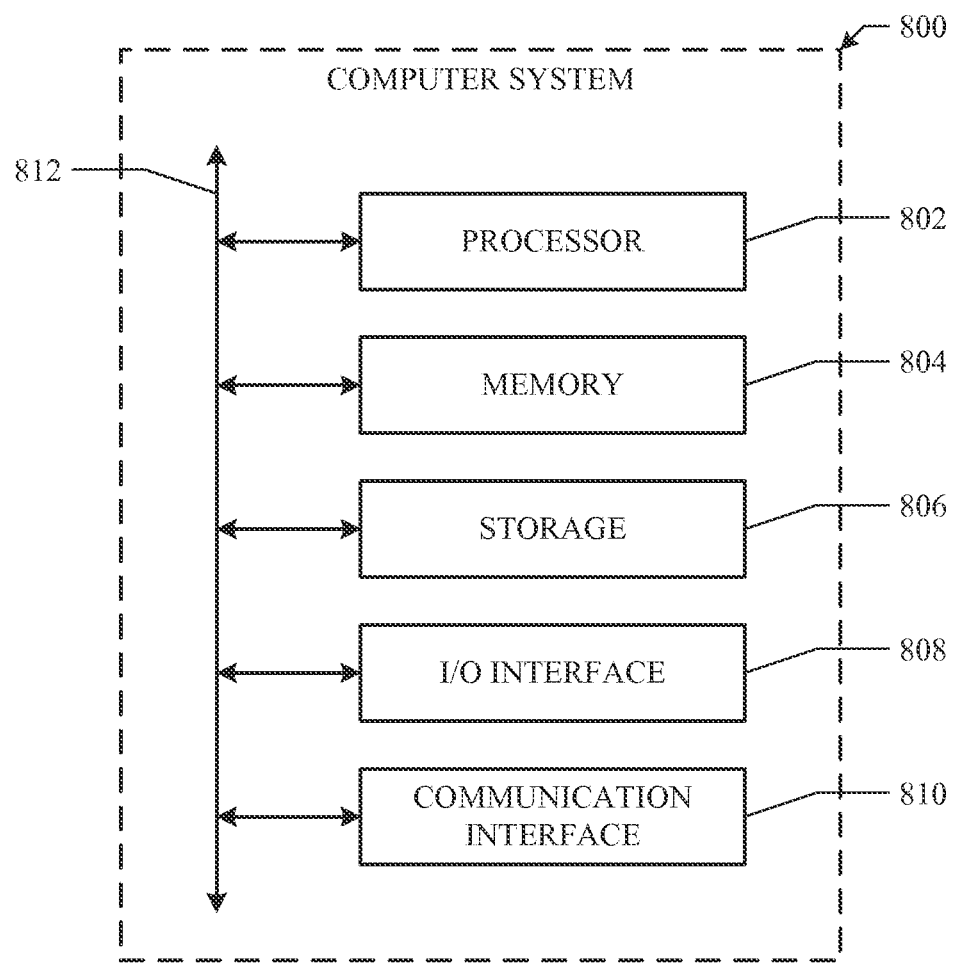
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at a client device of a first user of an online social network, a search query inputted at the client device;
responsive to the inputted search query:
searching, at the client device, a local cache of the client device to identify one or more local search results corresponding to one or more local objects stored in the local cache that match the search query, each local object being associated with the online social network and having been pre-stored at the local cache;
sending, from the client device to online social network, the search query to retrieve from one or more remote data stores of the online social network one or more primed search results corresponding to one or more primed objects stored on the data stores that match the search query; and
receiving, from the online social network, the primed search results retrieved from the one or more remote data stores, wherein the primed search results are stored in the local cache of the client device; and
generating, at the client device for display to the first user, a local search-results page comprising one or more local search results corresponding to one or more of the identified local objects, respectively, and a see-more-results element activatable to generate a full search-results page;
receiving, at the client device, an indication of the first user activating the see-more-results element; and
generating, at the client device for display to the first user, responsive to the activation of the see-more-results element, the full search-results page that supersedes the local search-results page, the full search-results page comprising:
one or more local search results corresponding to one or more of the identified local objects, respectively;
one or more primed search results corresponding to one or more of the primed objects, respectively; and
one or more search pivot elements corresponding to one or more object-types, respectively, wherein each search pivot element is activatable to retrieve the local and primed search results corresponding to the local and primed objects of the object-type corresponding to the activated search pivot element.

2. The method of claim 1, wherein the search query is an unstructured text query, and the method further comprises parsing the text query to identify one or more n-grams, wherein identifying one or more objects stored in the local cache that match the search query comprises identifying one or more objects stored in the local cache matching one or more of the identified n-grams.

3. The method of claim 1, further comprising:
receiving, at the client device, in response to an activation of one or more of the search pivot elements, one or more remote search results, the remote search results being generated by the online social network by searching a plurality of verticals to identify a plurality of sets of objects in each vertical, respectively, that match the search query, and wherein each vertical stores one or more objects associated with the online social network.

4. The method of claim 3, further comprising blending the plurality of sets of identified objects from each vertical to form a set of blended search results comprising a threshold number of identified objects.

5. The method of claim 3, wherein each vertical of the plurality of verticals stores objects of a particular object-type, the particular object-type being selected from a group consisting of: a user, a photo, a post, a page, an application, an event, a location, or a user group.

6. The method of claim 1, wherein each of the one or more objects correspond to a particular object-type, respectively, the particular object-type being selected from a group consisting of: a user, a photo, a post, a page, an application, an event, a location, or a user group.

7. The method of claim 1, wherein at least one search pivot element corresponds to a plurality of object-types.

8. The method of claim 1, wherein at least one search pivot element corresponds to a single object-type.

9. The method of claim 1, further comprising:
receiving, from the client device of the first user, an indication that a search pivot element has been activated;
searching the online social network to identify one or more additional objects stored in one or more of the remote data stores of the online social network that match the search query; and
sending, to the client device, a filtered search-results page comprising one or more search results corresponding to one or more of the identified objects and the one or more additional identified objects, respectively, and one or more search pivot elements corresponding to one object-type, respectively.

10. The method of claim 1, wherein the local search-results page and the full search-results page are each is a user interface of a native application associated with the online social network on the client system of the first user.

11. The method of claim 1, wherein the local search-results page and the full search-results page are each a webpage of the online social network accessed by a browser client of the client system of the first user.

12. One or more computer-readable non-transitory storage media embodying software that is operable when executed by a client device to:
receive, at a client device of a first user of an online social network, a search query inputted at the client device;
responsive to the inputted search query:
search, at the client device, a local cache of the client device to identify one or more local search results corresponding to one or more local objects stored in the local cache that match the search query, each local object being associated with the online social network and having been pre-stored at the local cache;
send, from the client device to online social network, the search query to the online social network to retrieve from one or more data stores of the online social network one or more primed search results corresponding to one or more primed objects stored on the data stores that match the search query; and
receive, from the online social network, the primed search results retrieved from the one or more remote data stores, wherein the primed search results are stored in the local cache of the client device; and
generate, at the client device for display to the first user, a local search-results page comprising one or more local search results corresponding to one or more of the identified local objects, respectively, and a see-more-results element activatable to generate a full search-results page;
receive, at the client device, an indication of an activation of the see-more-results element by the first user; and
generate, at the client device for display to the first user, responsive to the activation of the see-more-results element, the full search-results page that supersedes the local search-results page, the full search-results page comprising:
one or more local search results corresponding to one or more of the identified local objects, respectively;
one or more primed search results corresponding to one or more of the primed objects, respectively; and
one or more search pivot elements corresponding to one or more object-types, respectively, wherein each search pivot element is activatable to retrieve the local and primed search results corresponding to the local and primed objects of the object-type corresponding to the activated search pivot element.

13. A client device comprising: one or more processors; and a memory coupled to the processors comprising instructions executable by the processors, the processors operable when executing the instructions to:
receive, at a client device of a first user of an online social network, a search query inputted at the client device;
responsive to the inputted search query:
search, at the client device, a local cache of the client device to identify one or more local search results corresponding to one or more local objects stored in the local cache that match the search query, each local object being associated with the online social network and having been pre-stored at the local cache;
send, from the client device to online social network, the search query to the online social network to retrieve from one or more data stores of the online social network one or more primed search results corresponding to one or more primed objects stored on the data stores that match the search query; and
receive, from the online social network, the primed search results retrieved from the one or more remote data stores, wherein the primed search results are stored in the local cache of the client device; and
generate, at the client device for display to the first user, a local search-results page comprising one or more local search results corresponding to one or more of the identified local objects, respectively, and a see-more-results element activatable to generate a full search-results page;
receive, at the client device, an indication of an activation of the see-more-results element by the first user; and
generate, at the client device for display to the first user, responsive to the activation of the see-more-results element, the full search-results page that supersedes the local search-results page, the full search-results page comprising:
one or more local search results corresponding to one or more of the identified local objects, respectively;
one or more primed search results corresponding to one or more of the primed objects, respectively; and
one or more search pivot elements corresponding to one or more object-types, respectively, wherein each search pivot element is activatable to retrieve the local and primed search results corresponding to the local and primed objects of the object-type corresponding to the activated search pivot element.

14. The method of claim 1, wherein the online social network comprises a social graph comprising a plurality of nodes and a plurality of edges connecting the nodes, each of the edges between two of the nodes representing a single degree of separation between them, the nodes comprising:
a first node corresponding to the first user associated with the online social network; and
a plurality of second nodes that each correspond to a concept or a second user associated with the online social network.

15. The method of claim 14, wherein the local cache comprises information corresponding to a portion of the social graph including one or more stored nodes and one or more stored edges connecting the stored nodes, each stored node corresponding to one of the plurality of second nodes, and each stored edge corresponding to one of the plurality of edges.

16. The method of claim 1, further comprising:
receiving, at the client device of the first user, an input of a plurality of characters at the client device by the first user; and
responsive to receiving a threshold number of characters at the client device, generating the search query, wherein the search query is based on the plurality of characters inputted by the first user,
wherein the search query is automatically sent to the online social network responsive to receiving the threshold number of characters at the client device.

17. The method of claim 16, further comprising, by the client device, retrieving, from the local cache, one or more search results corresponding to one or more of the primed objects, respectively, corresponding to the primed search results that match the search query.

18. The client device of claim 13, wherein the search query is an unstructured text query, and wherein the processors are further operable when executing the instructions to parse the text query to identify one or more n-grams, wherein to identify one or more objects stored in the local cache that match the search query comprises to identify one or more objects stored in the local cache matching one or more of the identified n-grams.

19. The client device of claim 13, wherein the processors are further operable when executing the instructions to:
receive, at the client device, in response to an activation of one or more of the search pivot elements, one or more remote search results, the remote search results generated by the online social network through a search of a plurality of verticals to identify a plurality of sets of objects in each vertical, respectively, that match the search query, and wherein each vertical stores one or more objects associated with the online social network.

20. The client device of claim 19, wherein the processors are further operable when executing the instructions to blend the plurality of sets of identified objects from each vertical to form a set of blended search results that comprises a threshold number of identified objects.

21. The client device of claim 19, wherein each vertical of the plurality of verticals is configured to store objects of a particular object-type, the particular object-type being selected from a group consisting of: a user, a photo, a post, a page, an application, an event, a location, or a user group.

22. The client device of claim 13, wherein each of the one or more objects correspond to a particular object-type, respectively, the particular object-type being selected from a group consisting of: a user, a photo, a post, a page, an application, an event, a location, or a user group.

23. The client device of claim 13, wherein at least one search pivot element corresponds to a plurality of object-types.

24. The client device of claim 13, wherein at least one search pivot element corresponds to a single object-type.

25. The client device of claim 13, wherein the processors are further operable when executing the instructions to:
receive, from the client device of the first user, an indication that a search pivot element has been activated;
search the online social network to identify one or more additional objects stored in one or more of the remote data stores of the online social network that match the search query; and
send, to the client device, a filtered search-results page comprising one or more search results corresponding to one or more of the identified objects and the one or more additional identified objects, respectively, and one or more search pivot elements corresponding to one object-type, respectively.

26. The client device of claim 13, wherein the local search-results page and the full search-results page are each a user interface of a native application associated with the online social network on the client system of the first user.

27. The client device of claim 13, wherein the local search-results page and the full search-results page are each a webpage of the online social network accessed by a browser client of the client system of the first user.

28. The client device of claim 13, wherein the online social network comprises a social graph comprising a plurality of nodes and a plurality of edges connecting the nodes, each of the edges between two of the nodes representing a single degree of separation between them, the nodes comprising:
a first node corresponding to the first user associated with the online social network; and
a plurality of second nodes that each correspond to a concept or a second user associated with the online social network.

29. The client device of claim 28, wherein the local cache comprises information corresponding to a portion of the social graph including one or more stored nodes and one or more stored edges connecting the stored nodes, each stored node corresponding to one of the plurality of second nodes, and each stored edge corresponding to one of the plurality of edges.

30. The client device of claim 13, wherein the memory further comprises instructions when executed to:
receive, at the client device of the first user, an input of a plurality of characters at the client device by the first user; and
generate, responsive to a reception of a threshold number of characters at the client device, the search query, wherein the search query is based on the plurality of characters inputted by the first user,
wherein the search query is automatically sent to the online social network responsive to receiving the threshold number of characters at the client device.

31. The client device of claim 30, wherein the processors are further operable when executing the instructions to retrieve, by the client device from the local cache, one or more search results corresponding to one or more of the primed objects, respectively, corresponding to the primed search results that match the search query.

* * * * *